US006931376B2

(12) United States Patent
Lipe et al.

(10) Patent No.: US 6,931,376 B2
(45) Date of Patent: Aug. 16, 2005

(54) SPEECH-RELATED EVENT NOTIFICATION SYSTEM

(75) Inventors: Ralph Lipe, Clyde Hill, WA (US); Philipp Heinz Schmid, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 829 days.

(21) Appl. No.: 09/881,518

(22) Filed: Jun. 14, 2001

(65) Prior Publication Data

US 2002/0032569 A1 Mar. 14, 2002

Related U.S. Application Data

(60) Provisional application No. 60/219,861, filed on Jul. 20, 2000.

(51) Int. Cl.[7] .............................................. G10L 21/00
(52) U.S. Cl. ................... 704/270.1; 704/270; 704/275; 704/260
(58) Field of Search ...................... 704/270.1, 270, 704/275, 260

(56) References Cited

U.S. PATENT DOCUMENTS

| 4,771,401 A | 9/1988 | Kaufman et al. ............. 715/533 |
| 4,914,590 A | 4/1990 | Loatman et al. ................. 704/8 |
| 5,621,859 A | 4/1997 | Schwartz et al. ............. 704/256 |
| 5,748,974 A | 5/1998 | Johnson ......................... 704/9 |
| 5,799,273 A | 8/1998 | Mitchell et al. ............. 704/235 |
| 5,864,863 A | 1/1999 | Burrows .................. 707/103 R |
| 5,865,626 A | 2/1999 | Beattie et al. ............... 434/185 |
| 5,913,192 A | 6/1999 | Parthasarathy et al. ...... 704/256 |
| 5,933,525 A | 8/1999 | Makhoul et al. ............. 382/186 |
| 5,991,720 A | 11/1999 | Galler et al. ................. 704/256 |
| 5,995,928 A | 11/1999 | Nguyen et al. .............. 704/251 |
| 6,018,708 A | 1/2000 | Dahan et al. ................ 704/244 |
| 6,021,409 A | 2/2000 | Burrows ...................... 707/102 |
| 6,044,347 A | 3/2000 | Abella et al. ................ 704/272 |

(Continued)

OTHER PUBLICATIONS

Hatapka et al.; Sophisticated Speech Processing Middleware on Microprocessor; IEEE 3 rd Workshop on, Sep. 13–15, 1999; pp. 691–696.*

Hataoka et al. "Sophisticated Speech Processing Middleware on Microprocessor", 1999 IEEE 3rd Workshop on multimedia signal processing: Copenhagen, Sep. 13–15, 1999.

(Continued)

*Primary Examiner*—Abul K. Azad
(74) *Attorney, Agent, or Firm*—Joseph R. Kelly; Westman, Champlin & Kelly, P.A.

(57) ABSTRACT

The present invention is directed to a system and method of notifying a speech related application of events generated by a speech related engine. A middleware layer receives a notification selection from the application. The notification selection is indicative of a selected notification mechanism for notifying the application of the events. The middleware component receives an event indication from the engine. The event indication is indicative of an event generated by the engine. The event indication is transferred to the application according to the selected notification mechanism.

5 Claims, 8 Drawing Sheets

U.S. PATENT DOCUMENTS

| | | |
|---|---|---|
| 6,064,959 A | 5/2000 | Young et al. .............. 704/251 |
| 6,076,056 A | 6/2000 | Huang et al. .............. 704/254 |
| 6,138,098 A | 10/2000 | Shieber et al. ............. 704/257 |
| 6,243,678 B1 | 6/2001 | Erhart et al. ................ 704/249 |
| 6,314,399 B1 | 11/2001 | Deligne et al. ............ 704/257 |
| 6,374,226 B1 | 4/2002 | Hunt et al. ................. 704/275 |
| 6,377,913 B1 | 4/2002 | Coffman et al. ............... 704/8 |
| 6,377,925 B1 | 4/2002 | Greene et al. ............. 704/271 |
| 6,456,974 B1 | 9/2002 | Baker et al. ............ 704/270.1 |
| 6,466,909 B1 | 10/2002 | Didcock ..................... 704/260 |
| 6,487,533 B2 | 11/2002 | Hyde-Thompson et al. 704/260 |
| 6,513,009 B1 * | 1/2003 | Comerford et al. ........ 704/270 |
| 6,526,381 B1 | 2/2003 | Wilson ....................... 704/251 |
| 6,535,886 B1 | 3/2003 | Koontz ...................... 707/102 |
| 6,618,703 B1 | 9/2003 | Peres et al. ................. 704/270 |
| 6,636,831 B1 * | 10/2003 | Profit et al. ................. 704/275 |
| 6,757,655 B1 * | 6/2004 | Besling et al. .......... 704/270.1 |
| 2002/0138265 A1 | 9/2002 | Stevens et al. ............. 704/251 |

OTHER PUBLICATIONS

Isolated–word sentence recognition using probabilistic context–free grammar By: G.J.F. Jones et al. Eurospeech 91, 2nd European Conf. On Speech Comm. and Tech. Proceedings p. 487–9, vol. 2.

Context–free grammar driven, frame synchronous HMM-based continuous speech recognition methods using word spotting By: S. Nakagawa et al. Transactions of the Inst. of Electr., Information and Communication Engineers D–II vol. J76D–II, No. 7, p. 1329–36.

One–pass continuous speech recognition directed by generalized LR parsing By: K. Kita et al., ICSLP 94. 1994 International Conference on Spoken Language Processing.

The ARISTOTLE speech recognition system By: C. Waters et al., Progress in Connectionist–Based Information Systems.

A context–free grammar compiler for speech understanding systems By: M.K. Brown et al. ICSLP 94. 1994 International Conference on Spoken Language Processing Part. vol. 1, p. 21–4.

Efficient word–graph parsing and search with a stochastic context–free grammar By: C.J. Waters et al., 1997 IEEE Workshop on Automatic Speech Recognition and Understanding Proceedings.

Dynamic programming parsing for context–free grammar in continuous speech recognition By: H. Ney, IEEE Transactions on Signal Processing, vol. 39, No. 2, p. 336–40.

Using a stochastic context–free grammar as a language model for speech recognition By: D. Jurafsky, et al., 1995 International Conference on Acoustics, Speech, and Signal Processing. Part 1, p. 189–92, vol. 1.

Development of an effective context–free parser for continuous stochastic languages By: L.R. Strydom et al., AFRICON 96'. Incorporating AP–MTT–96 and COMSIG–96.

Reliable utterance segment recognition by integrating a grammar with statistical language constraints By: H. Tsukada et al., Speech Communication vol. 26, No. 4, p. 299–309.

Active middleware services in a decision support system for managing highly available distributed resources By: S.A. Fakhouri et al., International Conf. On Distributed Systems Platforms and Open Distributed Processing. Lecture Notes in Computer Science vol. 1795, p. 349–71.

Improving scalability of event–driven distributed objects architectures. By: D. Mencnarowski et al., Poland Journal: Software–Practice and Experience vol. 30, No. 13, p. 1509–29.

Improved spelling recognition using a tree–based fast lexical match. By: C.D. Mitchell et al., 1999 IEEE International Conf. On Acoustics, Speech and Signal Proceedings. vol. 2, p. 597–600.

Event management components for the 3/sup rd/ generation OSS By: S, Desrochers et al., Proceedings of Network Operations and Mangement Symposium Conference Date: Apr. 10–14, 2000 Conference Location: Honolulu, HI, USA.

A context–dependent similarity measure for strings By: E. Tanaka. Transactions of the Institute of Electronics and Communication Engineers of Japan, Part A, VO.. J67A, No. 6, p. 612–13.

READY: a high performance event notification service By: Gruber, R.E. et al. Proceedings 16th International Conference on Data Engineering Conference Sponsor: IEEE Comput. Soc. Tech. Committee on Data Eng. Conference Date: Feb. 29–Mar. 3, 2000 Conference Location: San Diego, CA, USA.

An event notification framework based on Java and CORBA By: Tomono, M. Japan Conference Title: Integrated Network Management VI. Distributed Management for the Networked Millennium.

Mobile streams By: Ranganathan, M et al., Proceedings of the Sixth Annual Tcl/Tk Conference p. 203–4 Publisher: USENIX Assoc, Berkeley, CA, USA Publication Date: 1998.

A flexible and recoverable client/server database event notification system By: Hanson, E.N. et al., VLDB Journal vol. 7, No. 1 p. 12–24, 1998.

Using events to build distributed applications Author (s): Bacon, J. et al., Second International Workshop on Services in Distributed and Networked Environments Conference Sponsor: IEEE Comput. Soc. Tech. Committee on Distributed Process Conference Date: Jun. 5–6, 1995.

High–Performance Alphabet Recognition, IEEE Speech and Audio Processing, By: Philipos C. Loizue et al. Nov. 1996, vol. 4, No. 6, pp. 430–445.

Speaker–Independent Name Retrieval From Spellings Using a Database of 50,000 Names, By: Ronald A. Cole et al., 1991 International Conference on Acoustics, Speech, and Signal Processing vol. 5, pp. 325–328.

IBM Voicetype Software, By: R. Fletcher, IEE Colloquium on the Language Toolkit Engineers in Business.

Temporal Decomposition and Acoustic–Phonetic Decoding for the Automatic Recognition of Continuous Speech By: P. Deleglise et al. 9th International Conference on Pattern Recognition. vol. 11, pp. 839–841.

Improving Recognizer Acceptance Through Robust, Natural Speech Repair By: Arthur E. McNair et al., 1994 International Conference on Spoken Language Processing. Pp. S22–15.1–S22–15.4.

Automated Directory Listing Retrieval System Based on Isolated Word Recognition By: Bernd Aldefeld et al., Proceedings of the IEEE, vol. 68, No. 11, Nov. 80 pp. 1364–1379.

Empirical evaluation of interactive multimodal error correction, By: Suhm, B., 1997 IEEE Workshop on Automatic Speech Recognition and Understanding Proceedings.

Noise robust speech recognition makes in-car navigation safe and affordable By: Smolders, J. et al. 'Steps Forward'. Proceedings of the Second World Congress on Intellectual Transport Systems '95 Yokohama Part vol. 2 p. 601–4 vol. 2.

Building a listener engine: a Smalltalk interface to speech recognition By: LaLonde, W., Pugh, J. Journal: Journal of Object Oriented Programming (JOOP) vol. 10, No. 7 1997–1998.

LEAP: Language Enabled Application By: Alabiso, B. ; Kronfeld, A. First International Workshop on Human–Computer Conversation. Draft Proceedings p. 15.

Tools for developing voice-operated applications By: Newstadt, R.E., Speech Technology vol. 4, No. 4, p. 62–6.

Examining Microsoft's Speech SDK By: Davis, P., Dr. Dobb's Journal vol. 24, No. 7 p. 86, 88–90. 1999.

Speech processing technology towards practical use By: Shirai, K.; Kobayashi, T.; Kudo, I., Joho Shori vol. 38, No. 11 p. 971–5.

Recent improvements on Microsoft's trainable text-to-speech system-Whistler By: Haung, X et al., 1997 IEEE International Conference on Acoustics, Speech and Signal Processing (Cat. No. 97CB36052) Part vol. 2 p. 959–62 vol. 2.

Software text-to-speech By: Hallahan, W.J.; Vitale, A.J., Journal: International Journal of Speech Technology vol. 1, No. 2 p. 121–34.

Japanese text-to-speech software (FLUET) based on waveform synthesis method By: Hakoda, K.; Tsukada, H.; Hirokawa, T.; Yoshida, Y.; Mizuno, H.

DECtalk Software: text-to-speech technology and implementation By: Hallahan, W.I., : Digital Technical Journal vol. 7, No. 4 p. 5–19.

The InfoPad user interface By: Burstein, A. et al., Digest of Papers. COMPCON '95. Technologies for the Information Superhighway.

Latest Office Action from related case.

Recently filed Response form related case.

* cited by examiner

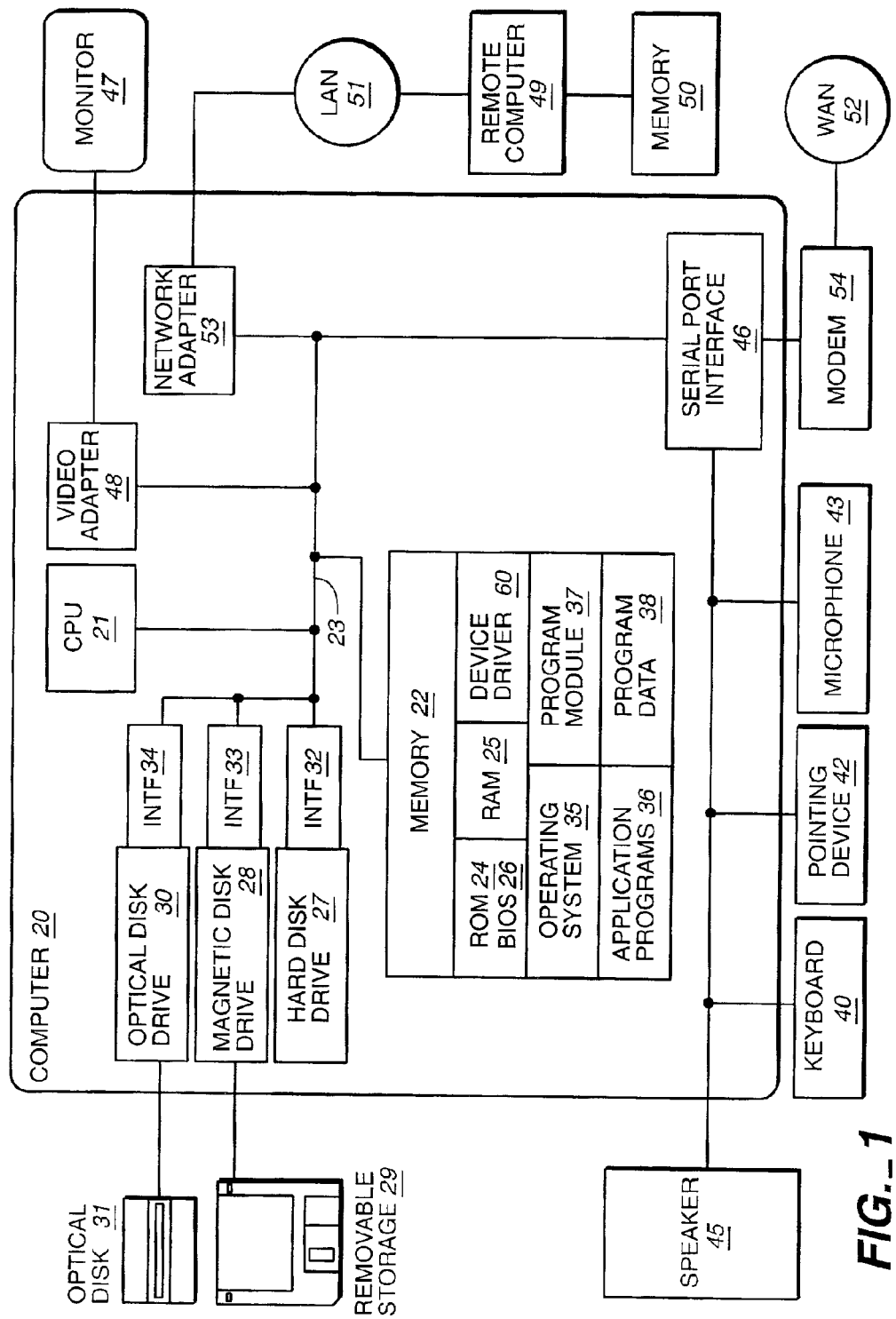
FIG._1

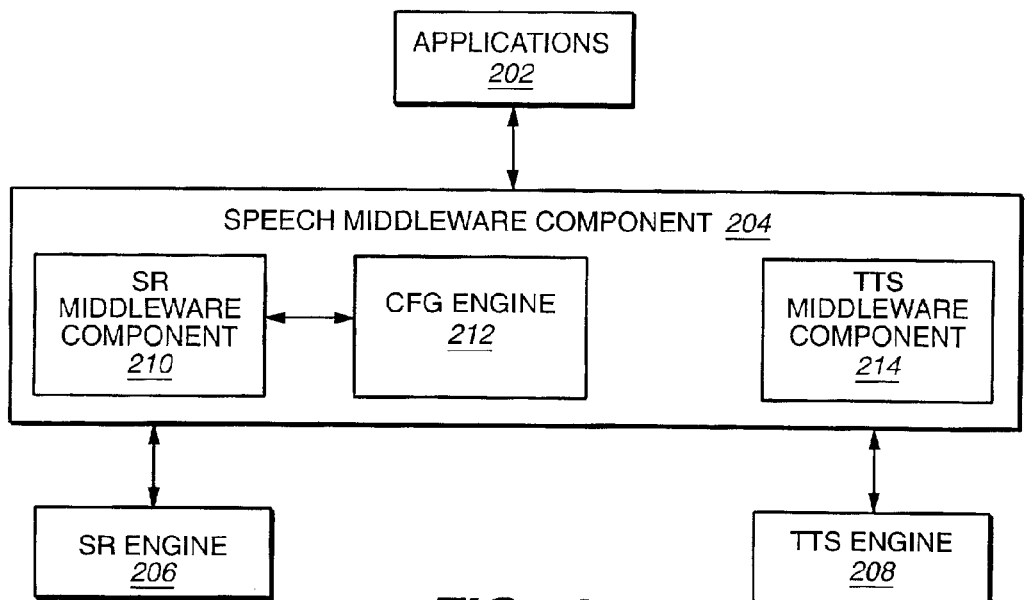
FIG._2
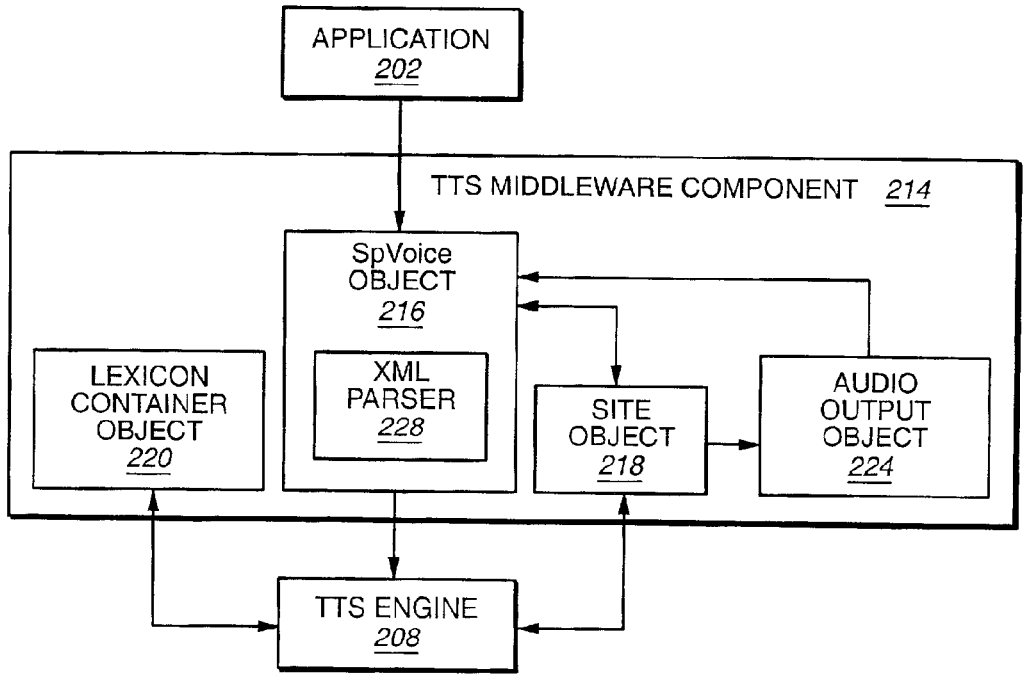
FIG._3

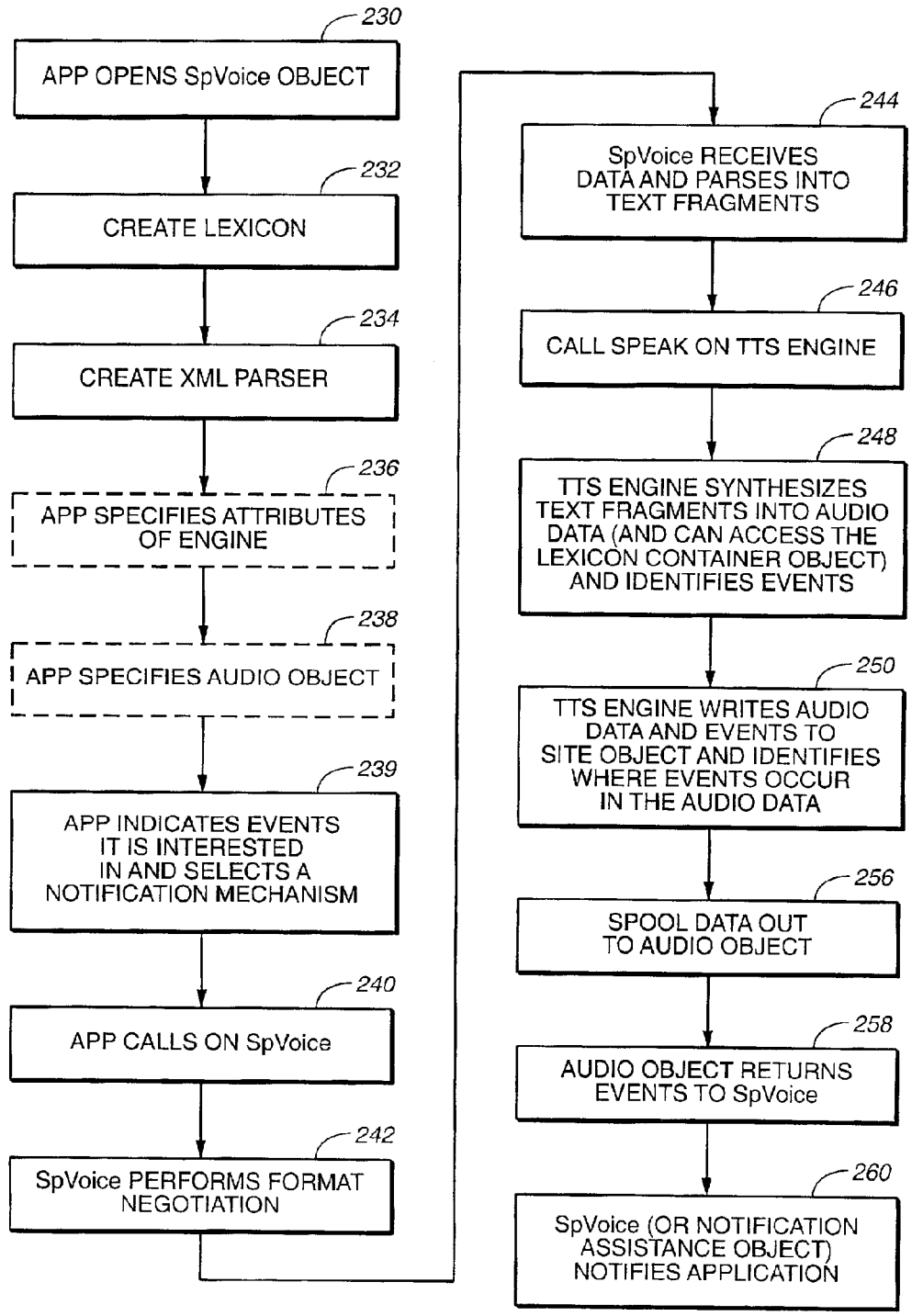
FIG._4

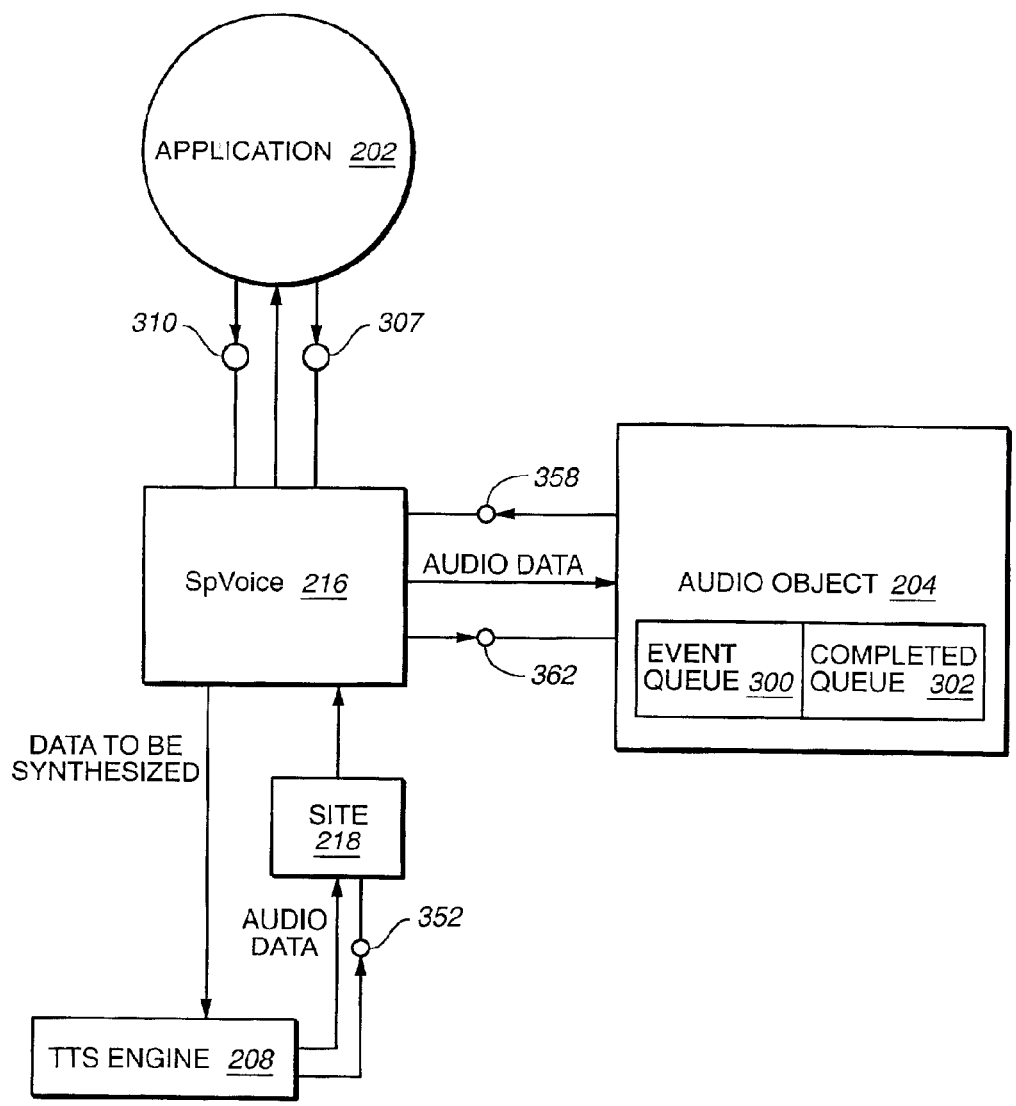
FIG._5

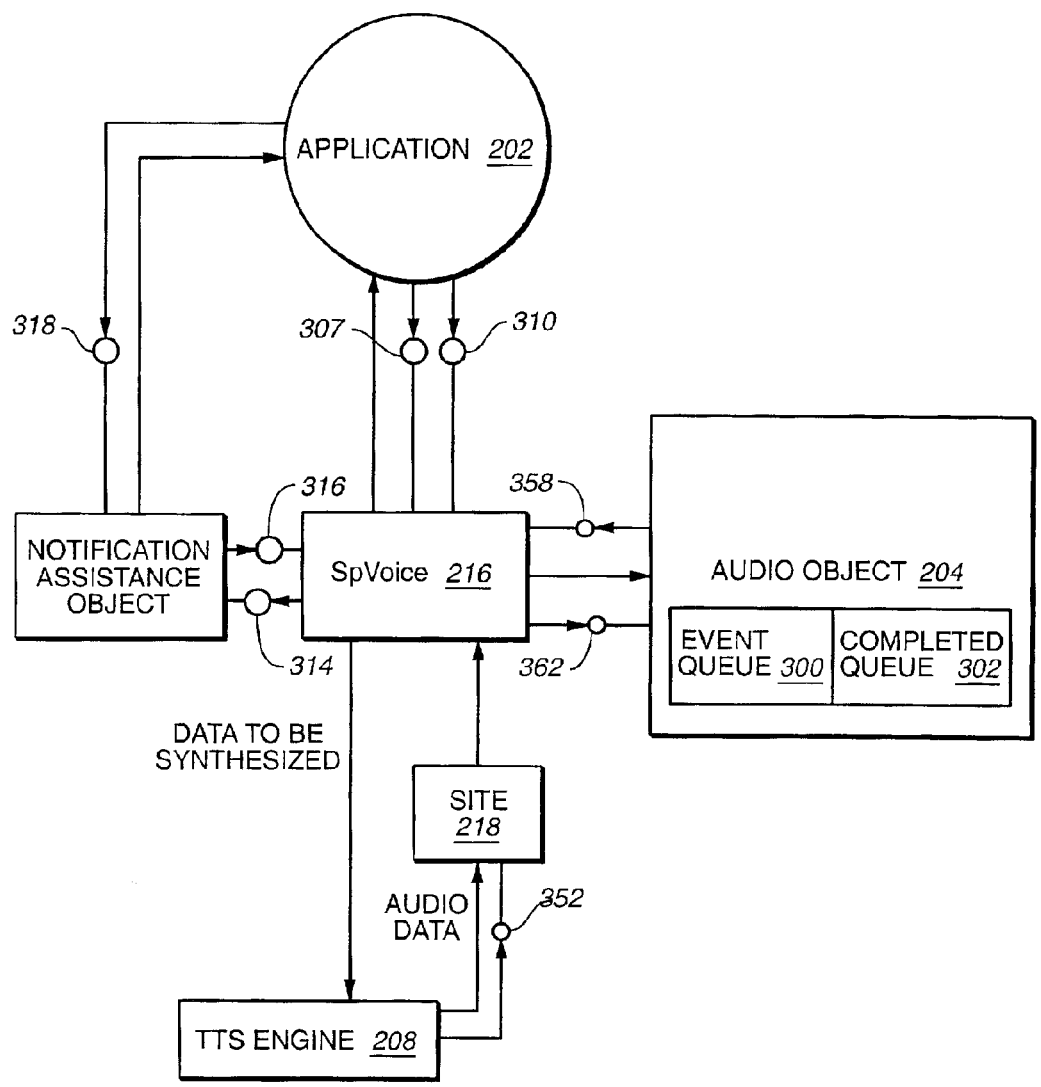
FIG._6

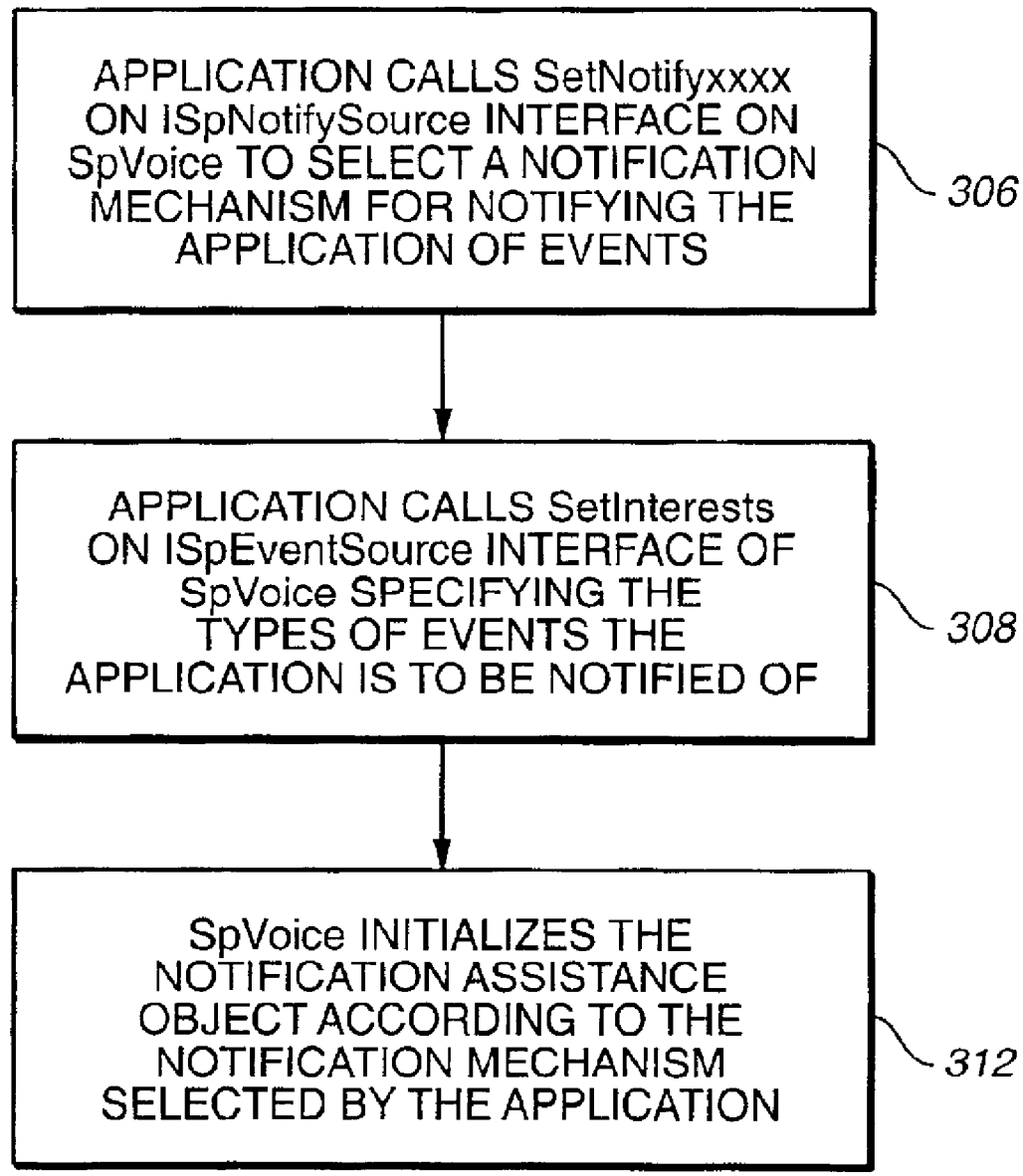
FIG._7

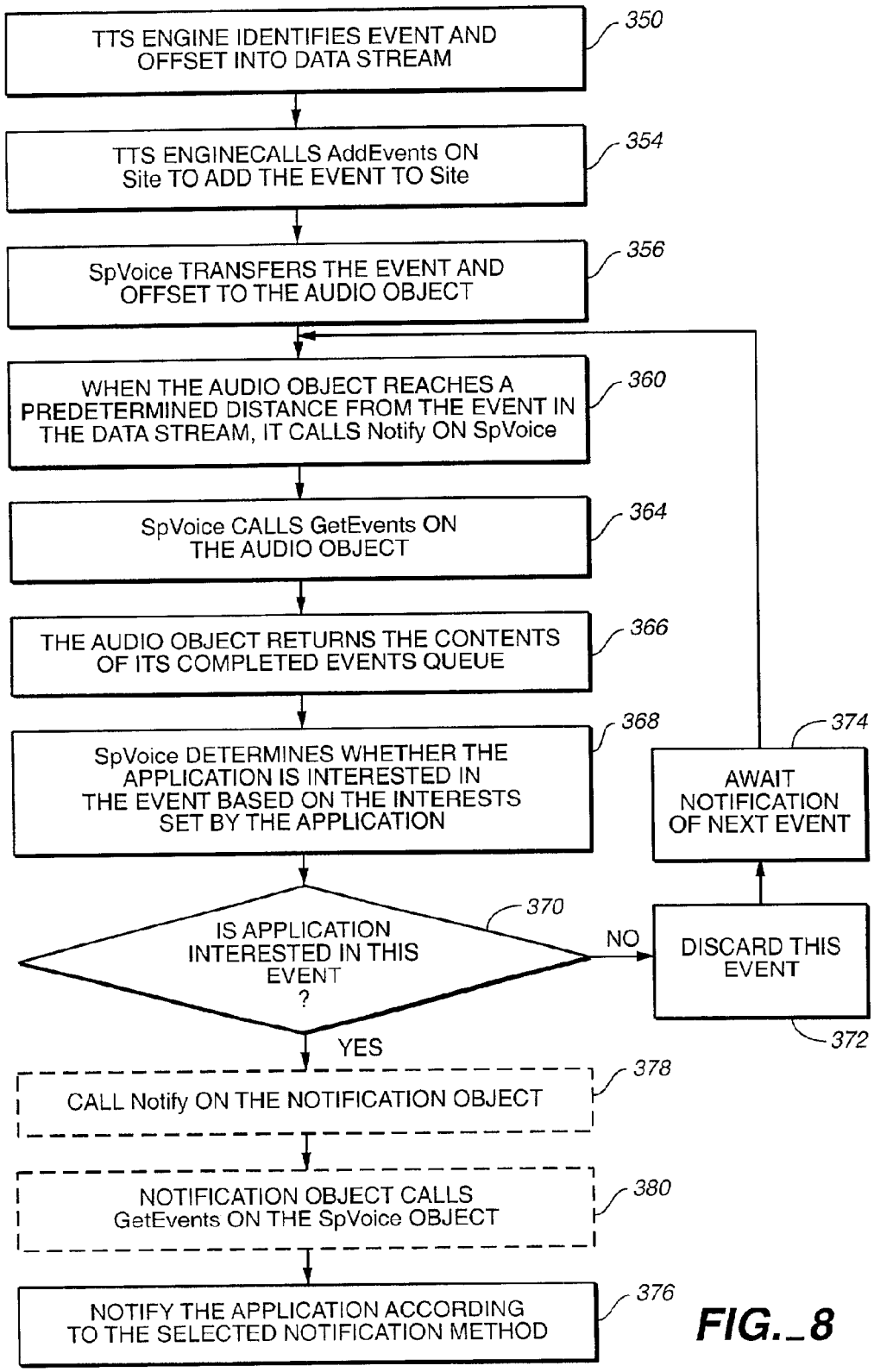
FIG._8

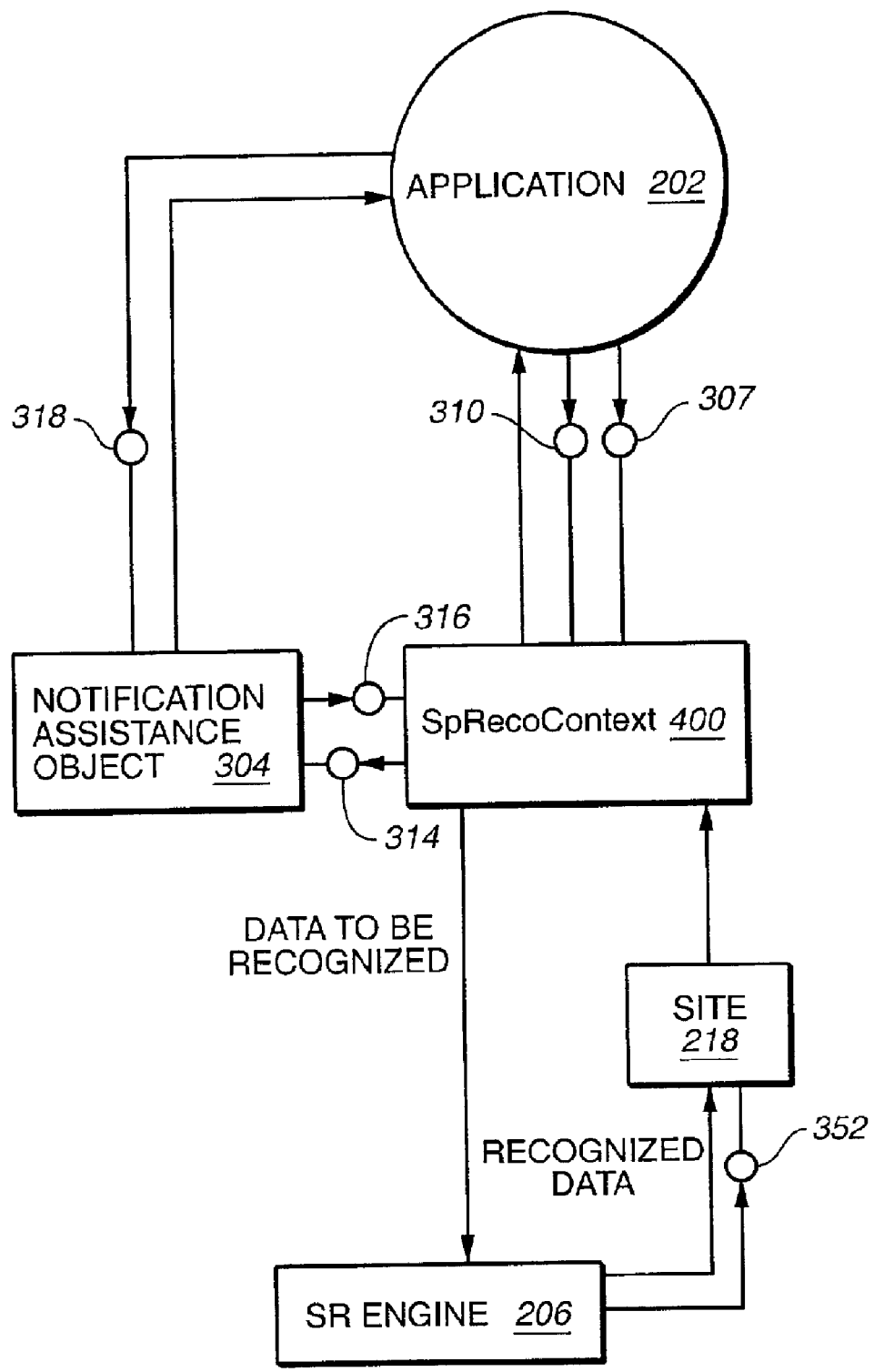
FIG._9

SPEECH-RELATED EVENT NOTIFICATION SYSTEM

The present application is based on and claims the benefit of U.S. provisional patent application Ser. No. 60/219,861, filed Jul. 20, 2000, the content of which is hereby incorporated by reference in its entirety.

INCORPORATION BY REFERENCE

The following Patent Application is hereby fully incorporated by reference, and priority is claimed therefrom; MIDDLEWARE LAYER BETWEEN SPEECH RELATED APPLICATIONS AND ENGINES, filed on Dec. 29, 2000, Ser. No. 09/751,836.

BACKGROUND OF THE INVENTION

The Present invention deals with services for enabling speech recognition and speech synthesis technology. In particular, the present invention relates to an event notification system in a middleware layer which lies between speech related applications and speech related engines.

Speech synthesis engines typically include a decoder which receives textual information and converts it to audio information which can be synthesized into speech on an audio device. Speech recognition engines typically include a decoder which receives audio information in the form of a speech signal and identifies a sequence of words from the speech signal.

In the past, applications which invoked these engines communicated directly with the engines. Because the engines from each vendor interacted with applications directly, the behavior of that interaction was unpredictable and inconsistent. This made it virtually impossible to change synthesis or recognition engines without inducing errors in the application. It is believed that, because of these difficulties, speech recognition technology and speech synthesis technology have not quickly gained wide acceptance.

In an effort to make such technology more readily available, an interface between engines and applications was specified by a set of application programming interfaces (API's) referred to as the Microsoft Speech API version 4.0 (SAPI4). Though the set of API's in SAPI4 specified direct interaction between applications and engines, and although this was a significant step forward in making speech recognition and speech synthesis technology more widely available, some of these API's were cumbersome to use, required the application to be apartment threaded, and did not support all languages.

The process of making speech recognition and speech synthesis more widely available has encountered other obstacles as well. For example, the vendors of applications and engines have been required to write an enormous amount of code simply to implement the different interfaces for the different applications and engines that can be used together. In such systems, event notification is very cumbersome. The engines are required to notify the applications directly of events, such as word boundaries, visemes, bookmarks, etc. This has required engines to know exactly how the application wished to be notified of such events. Similarly, output devices (such as audio devices in a text-to-speech system) have also been required to know when events are occurring and how an application wishes to be notified of the events. Since applications traditionally can be notified of events in one of a number of different ways, this required specific code to be written to interface to specific applications.

SUMMARY OF THE INVENTION

The present invention is directed to a system and method of notifying a speech related application of events generated by a speech related engine. A middleware layer receives a notification selection from the application. The notification selection is indicative of a selected notification mechanism for notifying the application of the events. The middleware component receives an event indication from the engine. The event indication is indicative of an event generated by the engine. The event indication is transferred to the application according to the selected notification mechanism.

In one embodiment, the event indication is first transferred to an output device, from the middleware component, which notifies the middleware component when it has reached the event in an output data stream. The middleware component then retrieves the event indication from the output device and transmits it to the application.

In another embodiment, prior to transferring the event indication to the application, the middleware component receives an interest indication from the application indicative of events that the application is interested in. When the middleware component receives an event notification from the output device, it first determines whether the application is interested in the event by comparing the event to the interest indication received from the application.

In another embodiment, the middleware component initializes a notification assistance component based on the notification selection made by the application. The notification assistance component notifies the application of the event according to the selected notification mechanism.

The present invention can also be embodied as a method and apparatus for synchronizing a speech related output with processing within an application. A speech related data stream to be processed is received at a middleware component between the engine and the application. The speech related data stream is transferred from the application to the speech related engine and is processed by the engine. Event indications from the engine are received at the middleware component. The event indications contain information that identifies an event and a position of the event in the data stream. The middleware component transmits the event and position to the application.

BRIEF DESCRIPTION OF THE DRAWINGS

FIG. 1 is a block diagram of a general computing environment in which the present invention may be practiced.

FIG. 2 is a block diagram of a speech-related system in accordance with the present invention.

FIG. 3 is a more detailed block diagram of a TTS middleware component shown in FIG. 2.

FIG. 4 is a flow diagram illustrating the general operation of the system shown in FIG. 3.

FIG. 5 is a more detailed block diagram illustrating the primary components used in an event notification system in accordance with one embodiment of the present invention.

FIG. 6 is a more detailed block diagram illustrating the primary components of the notification system in accordance with another embodiment of the present invention.

FIG. 7 is a flow diagram illustrating how notification assistance object is initialized.

FIG. 8 is a flow diagram illustrating the general operation of the notification system shown in FIGS. 5 and 6.

FIG. 9 is a more detailed block diagram illustrating the primary components of a notification system of the present invention as applied to a speech recognition system, as opposed to a speech synthesis system.

DETAILED DESCRIPTION OF THE ILLUSTRATIVE EMBODIMENTS

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

FIG. 2 is a more detailed block diagram of a speech system 200 in accordance with one embodiment of the present invention. It should be noted that speech system 200 can be incorporated into the environment illustrated in FIG. 1. Speech system 200 includes one or more speech applications 202 (such as speech recognition or speech synthesis applications), speech middleware component 204, one or more speech recognition engines 206 and/or one or more text-to-speech engines (synthesizers) 208.

In one illustrative embodiment, speech middleware component 204 is implemented in the operating system 134 illustrated in FIG. 1. Speech middleware component 204, as shown in FIG. 2, includes speech recognition middleware component 210, context free grammar (CFG) engine 212 and text-to-speech middleware component 214.

Briefly, in operation, speech middleware component 204 resides between applications 202 and engines 206 and 208. Applications 202 can be speech recognition and speech synthesis applications which desire to invoke engines 206 and 208. In doing so, applications 202 make calls to speech middleware component 204 which, in turn, makes calls to the appropriate engines 206 and 208 in order to have speech recognized or synthesized.

For example, applications 202 may provide the source of audio data for speech recognition. Speech middleware component 204 passes that information to speech recognition engine 206 which simply recognizes the speech and returns a recognition result to speech recognition middleware component 210. Speech recognition middleware component 210 places the result in a desired format and returns it to the application 202 which requested it or to another desired location specified by the application 202.

Similarly, an application 202 can provide a source of textual data to be synthesized. TTS middleware component 214 assembles that data, and provides it to TTS engine 208, for synthesis. TTS engine 208 simply synthesizes the data and returns audio information, along with associated event information, to TTS middleware component 214, which handles spooling of that information to an audio device, writing that information to memory, or placing that information in any other desired location, as specified by the application 202 which requested it.

CFG engine 212, briefly, assembles and maintains grammars that are to be used by speech recognition engine 206. This allows multiple applications and multiple grammars to be used with a single speech recognition engine 206.

FIG. 3 is a more detailed block diagram of a portion of system 200 shown in FIG. 2. Specifically, FIG. 3 illustrates TTS middleware component 214 in greater detail. TTS middleware component 214 illustratively includes a set of COM objects illustrated as the SpVoice object 216, Site object 218 and lexicon container object 220. In addition, TTS middleware component 214 can optionally include a format converter object and an audio output object 224. In one illustrative embodiment, communication between the objects in TTS middleware component 214 and applications 202 is accomplished using application programming interfaces (APIs). Similarly, communication between the objects in TTS middleware component 214 and the TTS engine object 208 is accomplished using device driver interfaces (DDIs). One illustrative embodiment of DDIs and APIs and their related structures is set out in related patent application Ser. No. 09/751,836 entitled MIDDLEWARE LAYER BETWEEN SPEECH RELATED APPLICATIONS AND ENGINES filed on Dec. 29, 2000.

A general discussion of the operation of TTS middleware component 214, with applications 202 and engine 208, is illustrated by the flow diagram in FIG. 4. Initially, application 202 opens an instance of the SpVoice object 216. In one illustrative embodiment, the application calls the COM CoCreateInstance for the component CLSID_SpVoice to get a pointer to the interface ISpVoice of the SpVoice object. SpVoice object 216 then creates lexicon container object 220 and an XML parser object 228. This is indicated by blocks 230, 232 and 234 in FIG. 4.

Next, application 202 can specify the attributes of TTS engine 208, such as whether the engine which is the synthesizer exhibits male or female voice qualities, the language of the synthesis, etc. This is done, for example, by calling the SetVoice method on the SpVoice object 216. This is indicated by optional block 236 in FIG. 4. In addition, the application can optionally specify the particular audio output object 224 which is desired. This is indicated by optional block 238 in FIG. 4.

The application 202 can set other attributes associated with the voice speaking, such as the rate and volume of speech, using for example, the SetRate and the SetVolume methods exposed by the SpVoice object 216. These are optional as well.

It should be noted that specifying the attributes of the engine 208 and audio output object 224 are optional. If the application does not specify these items, the first call to the SpVoice object 216 requiring synthesis results in the SpVoice object 216 choosing and initializing the default voice (i.e., the default TTS engine 208) and the default audio output object 224.

Application 202 must then indicated to SpVoice object 216 which particular events it is interested in, and how it wishes to be notified of those events. This will be discussed in greater detail below. Suffice it to say that application 202 will likely be interested in a variety of different events and will wish to be notified when those events are occurring (or prior to the occurrence) at audio output object 224. Similarly, application 202 may wish to be notified of the events in one of a variety of different manners. Therefore application 202 provides this information to SpVoice object 216. This is indicated by block 239.

Once these items are configured properly, application 202 can call the SpVoice object 216 and request that textual information be synthesized. This can be done, for example, by calling the Speak or the SpeakStream methods on the SpVoice object 216. This is indicated by block 240.

The SpVoice object 216 then performs format negotiation. This does not form part of the present invention and is only optional. Briefly, the SpVoice object 216 attempts to optimize the format of data created by TTS engine 208 and that accepted by audio output object 224 for optimal synthesis. Format negotiation is indicated by block 242 in FIG. 4.

The SpVoice object 216 then breaks the textual information provided by application 202 into text fragments. For example, if the textual information is in XML, the SpVoice object 216 invokes the XML parser 228 to parse the XML input into text fragments. While the textual information can come from a variety of sources (such as a text buffer, straight textual information, XML, etc.) that information is broken into text fragments by SpVoice object 216, as indicated by block 244 in FIG. 4.

The SpVoice object 216 then calls a speak method on TTS engine 208, passing in the information to be synthesized. This is indicated by block 246. In doing this, the SpVoice object 216 also specifies a Site object 218 to be used by the TTS engine for returning the synthesized information.

TTS engine 208 receives the text fragments, synthesizes the text into PCM (pulse code modulation) data (or other suitable audio data) and provides an indication of where events occur in the PCM data. For example, TTS engine 208 can illustratively provide an indication of where word and phoneme boundaries occur in the PCM data. This information is all provided from TTS engine 208 to SpVoice object 216 through the Site object 218.

It should be noted that, in performing the synthesis, TTS engine 208 can access the lexicon object 220 contained in TTS middleware component 214. The lexicon container object also forms no part of the present invention and is mentioned only for the sake of completeness. Briefly, the lexicon container object 220 contains all lexicons of interest and the TTS engine 208 simply needs to access object 220 as if it were a single lexicon.

Synthesizing the actual fragments and writing them and the events to the Site object are indicated by blocks 248 and 250 in FIG. 4.

During the format negotiation step 242, the SpVoice object 216 determines whether the format of the audio output object 224 or the format of the information provided by TTS engine 208 need to be converted. If conversion is required, information is provided to a format converter object, such as through the ISpAudio or ISpStream interfaces, where the information is converted into a desired format for the audio output object 224. The format converter object then manages the process of spooling out the audio information to audio output object 224 and also manages returning events noticed by the audio output object 224 to the Site object 218 and the SpVoice object 216 for transmission back to the application 202. Where no format conversion is desired, the information from the Site object 218 is spooled out to the audio output object 224 by the SpVoice object 216, through a suitable interface such as the ISpStream interface, and the audio output object 224 returns events to the SpVoice object. This is indicated by blocks 256 and 258.

Of course, it should also be noted that rather than providing the information directly to an audio output object 224, the information can be written to memory, or provided at some other specified output or location.

In notifying the SpVoice object 216 of events, audio output object 224 can do one of any number of things. For example, audio output object 224 can provide a notification that an event has occurred, or is occurring, as audio output object 224 is playing the data containing the event. However, it may well be that application 202 wishes to be notified of the event prior to the occurrence of the event at the audio object. For example, if the event is a viseme, application 202 may desire to be notified of the viseme so that it can animate a character on a computer screen, as the audio information is being played. In that instance, or in any instance where application 202 desires to be notified of the event prior to it occurring, audio output object 224 can be configured to notify the SpVoice object 216 that an event is about to occur at any predetermined offset prior to the event in the data stream. This simply requires audio output object 224 to look forward in the data stream by the offset amount and notify the SpVoice object 216 when an event is encountered.

As will be described later with respect to FIGS. 6, 7 and 9, the SpVoice object 216 (or its counterpart in SR middleware component 210) can initialize a notification assistance component whose primary job is to notify the application 202 of events. Therefore, when the SpVoice object 216 receives the event from audio output object 224, it first determines whether application 202 is even interested in the event. This was indicated at block 239 when the application indicated to SpVoice object 216 the particular types of events it was interested in.

Assuming that application 202 is interested in the event which has been notified, then SpVoice object 216 may notify application 202 directly of the event, using the specific notification mechanism selected by the application in step 239 of FIG. 4. However, when the notification assistance object has been initialized, the SpVoice object 216 notifies the notification assistance object that an event which the application is interested in has occurred. The notification assistance object then notifies the application 202 of the event. This is indicated by block 260.

FIG. 5 is a more detailed block diagram of components in the system shown in FIG. 3, which are used in notifying application 202 of events. A number of the items shown in FIG. 5 are the same as those shown in FIG. 3 and are similarly numbered. However, FIG. 5 also illustrates that audio object 204 includes an event queue 300 and a completed queue 302. As described in greater detail below, when events are provided to audio output object 204, they are placed in event queue 300. When they are reached by audio output object 204, they are placed in the completed queue 302, and then the audio output object 204 notifies SpVoice 216 of those events. FIG. 5 shows that the various objects in the system support a number of interfaces. Each interface exposes one or more methods, in order to implement the notification system. The data (such as data to be synthesized, and synthesized audio data) is simply shown by arrows. However, it will of course be appreciated that the data is illustratively passed among objects by invoking methods on interfaces exposed by the objects. Those interfaces are not discussed in great detail here since they do not form part of the present invention.

FIG. 6 is similar to FIG. 5, and similar items are numbered the same. However, FIG. 6 shows an embodiment in which a notification assistant object 304 has been initialized as well.

FIG. 7 is a flow diagram illustrating the initialization of notification assistance object 304. The application 202 calls SpVoice object 216 to select a notification mechanism for notifying the application of events. For example, application 202 can call the SetNotifyxxxx method on the ISpNotifySource interface 307 of SpVoice object 216. The xxxx designates the particular notification mechanism by which application 202 wishes to be notified.

For example, if the application 202 calls SetNotifySink that indicates that the application is implementing an ISpNotifySink which exposes a Notify method that can simply be called by notification assistance object 304 to notify application 202 of an event.

If the application invokes SetNotifyCallBackFunction that indicates that application 202 simply wishes to be notified using a callback function, such as those common in the C or C++ programming languages.

If application 202 invokes SetNotifyWindowMessage that indicates that application 202 wishes to be notified using a window callback function to receive notifications by having a window message posted.

If the application calls SetNotifyWin32Event this simply sets up a Win32 event object and indicates that the application supports Win32 event notification and can be notified according to that mechanism.

These are but a few of the possible notification mechanisms that can be selected. The application 202 notifying SpVoice 216 of its selected notification mechanism is indicated by block 306.

Application 202 then provides an indication as to the particular types of events it is interested in to SpVoice Object 216. This is indicated by block 308. In doing so, the application may illustratively invoke the SetInterests method on the ISpEventSource interface 310 on SpVoice object 216. This method allows the application 202 to specify the different event types which it wishes to be notified of.

Once SpVoice object 216 has received the selected notification mechanism from application 202, it initializes notification assistance object 304 according to the notification mechanism selected by the application. This is indicated by block 312. This can be done, for example, by initializing assistance object 304 by invoking the Initxxxx method on the ISpNotifyTranslator interface. Notification assistance object 304 is thus initialized such that, when SpVoice object 216 invokes the Notify method on the ISpNotifySink interface 314 supported by notification assistance object 304 notifies application 202 according to the selected method. In one illustrative embodiment, notification assistance object 304 supports an interface 318 which makes the events available for retrieval and examination by application 202. In another embodiment, notification assistance object 304 simply notifies application 302 of the event and application 202 retrieves or examines the event from the SpVoice object 216.

FIG. 8 is a flow diagram which illustrates the operation of the event notification systems shown in FIGS. 5 and 6. FIG. 8 presumes that TTS engine 208 has received data to be synthesized and is synthesizing that data. TTS engine 208 thus identifies events and an offset into the data stream where the event is located. This is indicated by block 350.

TTS engine 208 invokes the AddEvents method on interface 352 of the Site object 218. This adds the event identified at block 350 by the TTS engine to the Site object 218. This is indicated by block 354 in FIG. 8.

The SpVoice object 216 then transfers the event and its offset in the audio stream to audio object 204. The event and its offset are placed in event queue 300 in audio object 204. Of course, transferring of this event can be accomplished through appropriate interfaces as well. Transferring the event and its offset to event queue 300 in audio object 204 is indicated by block 356 in FIG. 8.

Audio object 204 begins playing the data. As it plays the data, it looks a predetermined offset distance ahead in the data stream to determine whether any events are upcoming in event queue 300. When the audio object encounters an event in the data stream, it transfers the event and its offset from the event queue 300 to its completed queue 302. After this is accomplished it invokes the Notify method on the ISpNotifySink interface 358 on the SpVoice object 216. This is indicated by block 360 in FIG. 8. This notifies SpVoice object 216 that audio object 204 has reached an event in its event queue.

After being notified of an event, SpVoice object 216 invokes the GetEvents method on the ISpEventSource interface 362 of audio object 204. This is indicated by block 364 in FIG. 8. Audio object 204 then returns to the SpVoice object 216 the contents of its completed events queue 302. This is indicated by block 366.

Upon receiving the event information indicative of the particular event about which SpVoice object 216 was notified, SpVoice object 216 determines whether an application 202 is even interested in being notified of this event. Recall that application 202 indicated the events in which it was interested to SpVoice object 216 by invoking the SetIntersts method on the ISpEventSource interface 310. Therefore, SpVoice object 216 simply needs to compare the event type which was returned from audio object 204 with those specified as being of interest to application 202. This is indicated by blocks 368 and 370 in FIG. 8. Of course, if the application is not interested in this event, the SpVoice object updates it's internal state and then the event is simply discarded and SpVoice object 216 awaits notification of the next event encountered by audio output object 204. This is indicated by blocks 372 and 374.

If SpVoice object 216 determines that application 202 is interested in this event, then what happens next depends on whether the notification system is an embodiment in which the notification assistance object 304 is implemented. If not, the processing simply proceeds at block 376 and SpVoice object 216 simply notifies application 202 according to the notification mechanism which it selected at the outset.

However, if notification assistance object 304 is implemented (as shown in FIG. 6) then SpVoice object 216 indicates to object 304 that an event has been encountered. In one illustrative embodiment, SpVoice object 216 does this by invoking the Notify method on the ISpNotifySink interface 314 supported by notification assistance object 304. This is indicated by block 378 in FIG. 8. At that point, notification assistance object 304 notifies application 202 according to the selected notification method, for which it was initialized. This is indicated by block 376. In one embodiment, notification assistance object retrieves the event from the SpVoice object and makes it available to the application, as indicated by block 380. In another embodiment, the notification assistance object simply notifies the application of the event and the application accesses the SpVoice object for the event.

FIG. 9 is a more detailed block diagram illustrating a notification system in conjunction with speech recognition engine 206. A number of items are similar to those shown in FIGS. 5 and 6 and are similarly numbered. Of course, the event notification system can be implemented with or without notification assistance object 304. It is shown with notification assistance object 304 for the sake of completeness.

SpRecoContext object 400 is the counterpart to the SpVoice object 216 in TTS middleware component 214 in that it generally manages data flow and performs services within SR middleware component 210. The SpRecoContext object 400 exposes one or more interfaces that can be used with application 202. SpRecoContext object 400 also calls interface methods exposed by SR engine object 206. A more detailed discussion of the SpRecoContext object 400 can be found in the above-identified and related patent application. However, no further explanation is needed for the sake of the present invention.

Processing events is highly similar to that with respect to the TTS systems shown in FIGS. 5 and 6. In other words, SR engine 206 receives voice data to be recognized. The recognition results are provided to Site object 218. Also, events (such as recognitions, word boundaries, phoneme boundaries, etc.) are added to Site object 218 by invoking the AddEvents methods. These items are provided back to the SpRecoContext object 400. In response, in the embodiment in which notification assistance object 304 is not present, SpRecoContext object 400 simply determines whether application 202 is interested in the events (because the application has previously notified SpRecoContext object 400 of the events in which it is interested) and, if so, notifies application 202 by calling the applicatoion's Notify method.

In the embodiment shown in FIG. 9, in which the notification assistance object 304 is implemented, SpRecoContext object 400 calls Notify on the ISpNotifySink interface 314 supported by object 304. This indicates to object 304 that SpRecoContext object 400 has encountered an event. In response, the notification assistance object 304 notifies application 202 according to its selected notification mechanism, by which notification assistance object 304 was initialized. Of course, where an input object is used with SpRecoContext object 400, interaction is similar to that with respect to the audio output object 204 in SpVoice object 216.

Appendix A illustrates a number of the interfaces discussed herein in greater detail, simply for the sake of completeness. They can be implemented in other ways as well and still comport with the inventive features of the present invention.

It can thus be seen that the present invention is directed to a middleware layer that is arranged between the applications and engines. The middleware layer supports interfaces that allow the applications to select one of a variety of different types of notification mechanisms. The middleware layer then configures itself to provide event notification from the engine to the application in the selected manner. In addition, the present invention allows an output device to simply notify the middleware layer when it has encountered the location in the output data stream which coincides with an event. The middleware layer then takes care of notifying the application, and the output device need not even be aware of the type of the event for which notification was sent. This also significantly simplifies the coding required to make output devices consistent with the other components in the system.

Although the present invention has been described with reference to preferred embodiments, workers skilled in the art will recognize that changes may be made in form and detail without departing from the spirit and scope of the invention.

What is claimed is:

1. A method of notifying a speech related application of events generated by a speech related engine, comprising:

receiving a notification selection and an interest indication from the application at a middleware component between the application and the engine, the notification selection being indicative of a selected notification mechanism, selected by the application, for notifying the application of the events, the interest indication being indicative of events generated by the engine for which the application is to receive notification;

initializing a notification assistance component to notify the application according to the selected notification mechanism;

receiving an event indication including an event identifier from the engine, the event indication being indicative of an event generated by the engine;

transferring the event indication from the middleware component to an output device that processes a data stream containing the event, and when the output device reaches a predetermined distance from the event in the data stream, notifying the middleware component;

transferring the event indication back to the middleware component;

notifying the application of the event indication from the middleware component according to the selected notification mechanism by transferring the event indication to the notification assistance component and notifying the application from the notification assistance component of the event indication;

receiving a request from the application at the middleware component for the event identifier; and transferring the event identifier from the middleware component to the application.

2. The method of claim 1 wherein the predetermined distance comprises a predetermined offset in the data stream prior to the event.

3. The method of claim 1 wherein the event indication includes an event identifier identifying the event and wherein transferring the event indication back to the middleware component from the output device is performed regardless of whether the output device correlates the event identifier to the event it identifies.

4. The method of claim 1 wherein the middleware component comprises a middleware object and the notification assistance component comprises an assistance object and wherein transferring the event indication to the notification assistance component comprises:

invoking a method exposed by the assistance object to notify the assistance object of the event indication; and invoking a method exposed by the middleware component to obtain the event indication.

5. The method of claim 1 wherein receiving an event indication from the engine comprises:

exposing a method on an engine interface on the middleware component to add events from the engine to an event queue in the middleware component.

* * * * *